Figure 1:
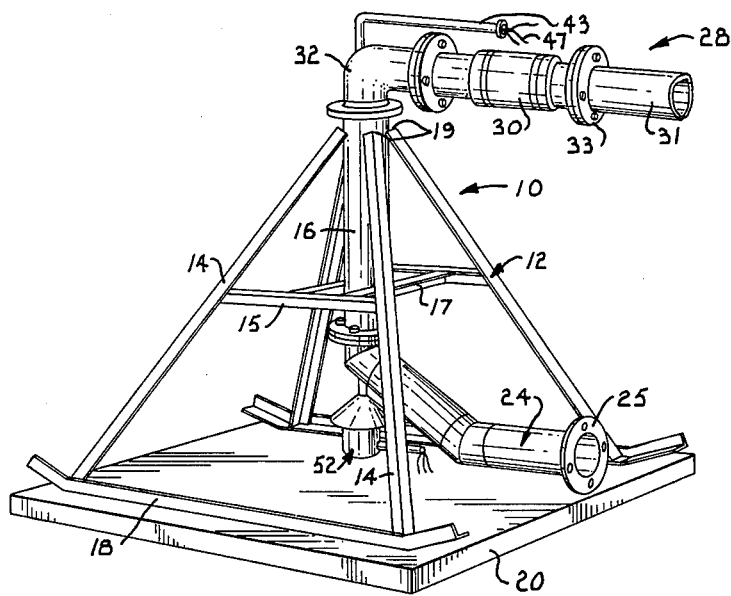

United States Patent [19]
Reinke

[11] 3,936,117
[45] Feb. 3, 1976

[54] IRRIGATION PIVOT STAND CONSTRUCTION

[76] Inventor: Richard F. Reinke, Reinke Manufacturing Company, P.O. Box 480, Deshler, Nebr. 68340

[22] Filed: Sept. 10, 1974

[21] Appl. No.: 504,808

[52] U.S. Cl. .................... 339/8 R; 239/177; 339/68
[51] Int. Cl.$^2$ ........................................ H01R 39/00
[58] Field of Search............ 339/5 R, 5 L, 8 R, 8 L, 339/68; 239/177

[56] References Cited
UNITED STATES PATENTS

| | | | |
|---|---|---|---|
| 3,608,826 | 9/1971 | Reinke............................... | 239/177 |
| 3,784,106 | 1/1974 | Ross.................................. | 239/177 |

*Primary Examiner*—Roy Lake
*Assistant Examiner*—DeWalden W. Jones
*Attorney, Agent, or Firm*—Lowe, Kokjer, Kircher, Wharton & Bowman

[57] ABSTRACT

A pivot stand structure for circular irrigation systems. A rigid frame mounts a water supply pipe having a vertically oriented end portion which receives a rotatable, readially outwardly extending water delivery pipe. The delivery pipe supplies water to remotely located irrigation heads which are mounted thereon and moved circumferentially by a plurality of electrically powered, motorized carriages. A rotatable conduit is coupled with the delivery pipe and extends through a vertical leg of the latter and out through an elbow in the water supply pipe. This conduit contains a plurality of electrical control conductors which are coupled with the electric drive motors. Mounted beneath the vertical end portion of the water supply pipe in axial alignment therewith is a slip ring housing. The slip ring housing mounts a plurality of slip rings which are adapted to be coupled with a source of electrical power. The control conductors are provided with wiping contacts at their terminal ends which establish electrical connection with the slip rings, so that electrical power is thereby delivered to the motors. By mounting the slip rings beneath the supply pipe a simpler installation is facilitated and the slip ring housing is easily accessible for service.

6 Claims, 2 Drawing Figures

U.S. Patent  February 3, 1976  3,936,117

IRRIGATION PIVOT STAND CONSTRUCTION

This invention relates to revolving, circular, irrigation sprayer systems. More particularly the invention relates to an improved slip ring assembly for use with revolving irrigation systems which distribute water through a water delivery pipe that is supported and rotated about a stationary pivot stand by a plurality of electrically driven, motorized support carriages.

Slip ring or collector ring assemblies are employed in revolving irrigation systems to provide an electrical connection between stationary and rotating conductors. The conductors deliver electric power and control signals to a plurality of motorized carriages which rotate the water distribution pipe. Prior art devices such as the rotatable irrigation systems of Allwood, shown in U.S. Pat. No. 3,355,696 and Ross, shown in U.S. Pat. No. 3,720,374, are known to employ slip ring assemblies in conjunction with electrical distribution.

In the prior art devices, however, the slip rings are mounted in a housing located on top of the rotating water delivery pipe. As a result of this location, the slip ring housing (which must rotate with the water delivery pipe) is susceptible to breakdown from vibratory forces. Additionally, this inconvenient upward location makes it difficult to reach the slip ring assembly for service or repairs. Furthermore the extreme distance between the pivot station power supply and the slip ring assembly often necessitates the use of splices in the conduit conductors during initial assembly of the pivot stand.

Another disadvantage of the prior art devices is the practice of using a right angle elbow for the electrical conduit which is positioned inside of the vertical leg of the water supply pipe. Such a conduit extends through the wall of the water supply pipe at a right angle, making it extremely difficult to withdraw the conduit without disassembly of the delivery and supply pipes.

The present invention relates to a pivot stand assembly wherein a water supply pipe has a vertical portion coupled to a cooperating vertical portion of a rotatable water delivery pipe, and a straight conduit extends from the top of the stand through both vertical pipe portions to a bottom-mounted slip ring assembly. The slip ring assembly is located beneath the water supply pipe near the electrical power supply. Cables leading from the power supply are electrically connected to the slip ring assembly (without the need for splices) in order to electrically interconnect the power supply with cables in the conduit. The conduit cables lead to remotely located carriage drive motors and deliver electricity thereto to effect the rotation of the water delivery pipe. Since the slip ring assembly in the present invention is located beneath both the water delivery and water supply pipes on a stationary mount, normal forces of vibration have only a minimal effect on the slip ring assembly so that life expectancy is thereby increased. In the event of trouble however, ease of service is facilitated because the slip ring assembly is conveniently accessible at the bottom of the pivot stand, and the conduit has no right angle bends (in the portion thereof which penetrates the water supply and delivery pipes), so that it may be easily disassembled for repairs.

It is thus a fundamental object of this invention to provide an irrigation stand pipe structure wherein the slip ring assembly is located on a stationary part of the structure rather than a moving part, so that deleterious vibratory forces on the slip ring assembly are minimized.

It is a further object of this invention to provide an irrigation stand pipe assembly wherein the slip ring assembly is located at a low elevation beneath the water supply pipe. As a result of this, the need to climb a ladder or other structure in order to reach the slip ring assembly for servicing or maintenance is obviated. Also, the need for splices between the slip ring assembly and the power supply source is minimized because of the proximity of the slip ring assembly to the power supply, which is generally located at the bottom of the pivot stand.

It is yet another object of this invention to provide a pivot stand assembly wherein the cable conduit, which extends through the vertical portions of the water supply and water delivery pipes, is straight. The conduit may thus be extracted during service or maintenance without disassembly of the aforementioned pipes.

Figure 2:
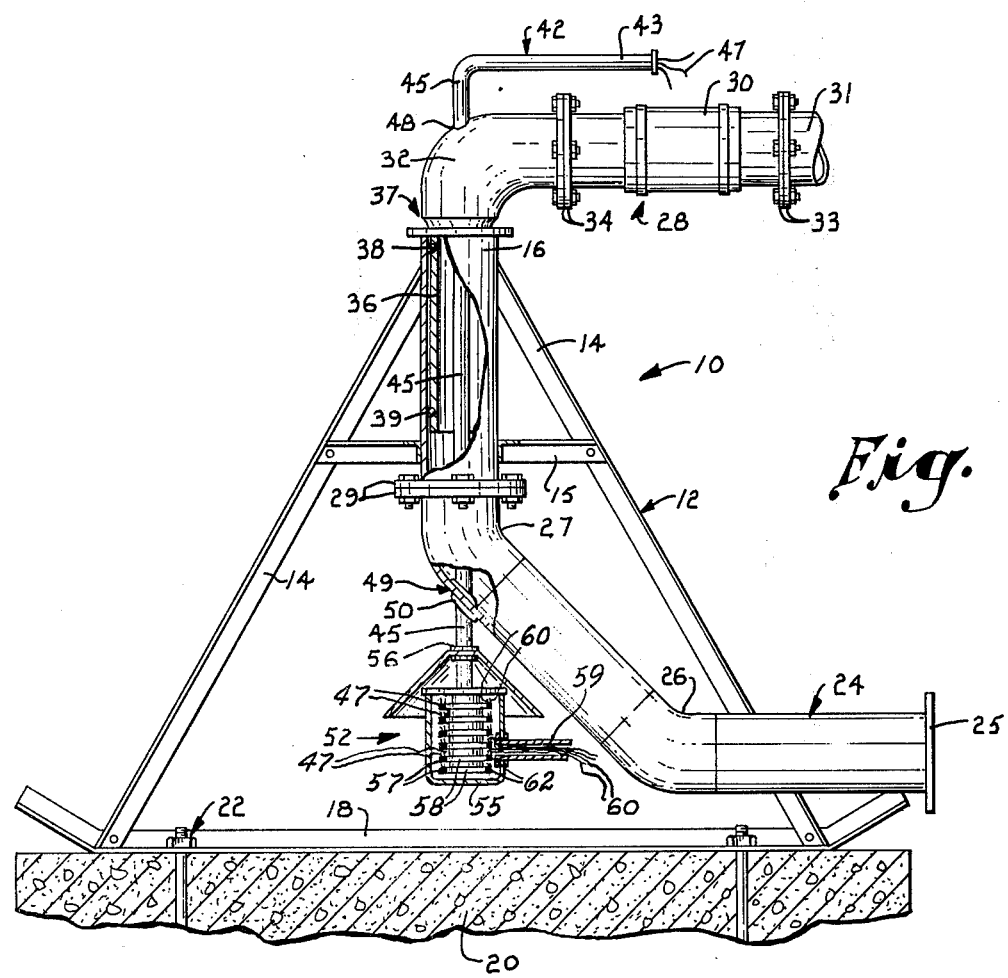

In the accompanying drawing:

FIG. 1 is a perspective view of a pivot stand assembly constructed in accordance with the principles of this invention; and FIG. 2 is a side elevational view on an enlarged scale of the pivot stand assembly shown in FIG. 1 with portions thereof broken away and shown in cross section for purposes of illustration.

Referring initially to FIG. 1, a pivot stand assembly, designated generally by the numeral 10, comprises a rigid pyramidal frame 12 which is formed by downwardly diverging rigid angle steel members 14. The upper ends of frame members 14 converge into closely spaced relationship near the top of the pivot stand to form a pyramid. The bottom ends of the frame members are rigid with first and second elongated runners 18, which are in turn rigidly secured to a preferably concrete supporting surface 20 by a plurality of nut and bolt assemblies 22 (FIG. 2). Two sets of horizontal, rigidly joined braces 15 and 17 (disposed at right angles to each other) are also rigid with frame members 14.

Water is delivered to the irrigation pivot stand by an external water main pipe (not shown), which is connected to a water supply pipe 24 via a flange 25. As seen in FIG. 2, pipe 24 is provided with a pair of elbow segments 26 and 27, which cooperate to form a right angle bend and facilitate connection of pipe 24 to a vertical pipe end portion 16 of the water supply pipe. Connection of the end portion 16 to the water supply pipe is accomplished through facing flanges 29 and appropriate nut and bolt assemblies. End portion 16 is braced in a vertically upright position by rigid coupling with horizontal brace members 17 and the upper end portions 19 of frame members 14.

A water delivery pipe 28 includes a stress-accommodating flexible linkage 30, which interconnects a horizontal pipe portion 31 with a right angle elbow portion 32 via flange connections 33 and 34. L-shaped elbow portion 32 is tapered at its downwardly extending end 37 to form a vertically disposed segment 36 of reduced diameter that is matingly received within the sleeve presented by end portion 16 (FIG. 2) to form a rotatable swivel connection. A pair of sealing rings 38 and 39 permit segment 36 to turn within end portion 16 while precluding the leakage of water from end 37.

A waterproof, tubular conduit 42 comprises a horizontally oriented portion 43 and a downwardly extending vertical portion 45. Horizontal portion 43 extends along pipe 28 and is oriented generally parallel with respect thereto. Conduit 42 houses a plurality of electrical control conductors 47, which, as will be discussed later, deliver electricity to a plurality of electric carriage motors (not shown).

Vertical portion 45 penetrates elbow 32 at an interface 48 and is disposed concentrically within segment 36 (and end portion 16). Portion 45 extends also interiorly of pipe 24, and penetrates same to exit therefrom at interface 49. Interface 48 is weldably sealed to permanently prevent water leakage. Interface 49 is provided with a sealing gland 50, which is located between pipe 24 and conduit portion 45 to facilitate leakproof rotation of the conduit.

Conduit portion 45 extends downwardly from interface 49 and is received within a stationary slip ring assembly 52, which is located beneath elbow 27 of pipe 24 at a predetermined distance above surface 18. Assembly 52 is disposed in vertical, axial alignment with respect to end pipe 16.

Assembly 52 comprises a shield 54 and an underlying slip ring housing 55. Conduit 45 passes through shield 54 and into housing 55. Each of the conductors 47 within conduit portion 45 is electrically connected to an appropriate slip ring 58 in housing 55 through a wiping contact 57. A sealing gland 56 is provided in the top of shield 54 to prevent water from entering the slip ring assembly while at the same time enabling rotation of conduit 45 which passes therethrough. A rigid, static conduit 59 extends from housing 55 to a stationary, electrical power supply (not shown) which is fixedly located nearby. Conduit 59 thus maintains housing 55 (and assembly 52) in the correct stationary alignment.

Conduit 59 contains a plurality of electrical conductors 60 which are electrically connected to appropriate voltage outputs in the power supply (not shown). The conductors 60 extend interiorly of housing 55, wherein each conductor is electrically connected to an appropriate wiper contact 62. Each wiper contact 62 touches an appropriate slip ring 58 to thereby electrically connect the conductors 47 with appropriate ones of the conductors 60. The voltages outputted by the power supply are thus carried by conductors 47.

In operation, water is forced into pipe 24, up through end portion 16 and sleeve 36, and into water delivery pipe 28, which horizontally extends radially outwardly from the pivot stand. Water is ultimately discharged into the field from a plurality of spray nozzles (not shown) located at various points along pipe 28.

Pipe 28 is supported and rotated about the pivot stand by a plurality of electric, motor-driven carriages (not shown) which are located at predetermined intervals along pipe 28. Electricity is delivered to the various carriages by conductors 47 (within conduit 42), thereby energizing same and causing rotation of pipe 28. As discussed earlier, rotation is facilitated by the swivel coupling of sleeve segment 36 within pipe 16. Conduit 42 rotates simultaneously with pipe 28. Continuous uninterrupted current is supplied during rotation as a result of the wiping contact between conductors 47 and slip ring 58. As a result of the location of the slip ring assembly 52 at a relatively low elevation and beneath the rotating delivery, and in a stationary position, it is both protected and less subject to vibratory forces. It is also easily accessible for service and minimizes the distance to the power supply outlet. Most advantageous is the fact that the straight vertical portion 45 accommodates easy removal of conduit 42 without the need to completely disassemble the stand pipe structure.

Having thus described my invention, I claim:

1. A pivot stand for circular irrigation systems comprising:
   a frame adapted to be disposed on a supporting surface;
   a stationary water supply pipe having a pipe end portion directed vertically upwardly with respect to said surface and mounted on said frame in spaced relationship to said supporting surface;
   a rotatable water delivery pipe extending radially outwardly from said end portion and having a downwardly directed segment rotatably coupled with said end portion;
   a rotatable conduit containing a plurality of electrical control conductors, said conduit being coupled with said delivery pipe for rotation therewith and having a vertical portion passing in through said end portion and out through said segment;
   a slip ring assembly enclosing a plurality of slip rings mounted beneath said end portion;
   a plurality of wiping contacts disposed for electrical contact with said slip rings within said housing,
   one of said contacts and said slip rings coupled with said electrical control conductors and the other of said contacts and said slip rings coupled with an external power supply whereby to supply electrical current to the electrical control conductors.

2. The invention of claim 1, wherein said pipe end portion extends upwardly in generally perpendicular relationship to said surface and said conduit extends through said portion in parallel relationship thereto.

3. The invention as in claim 2 including sealing means for preventing the leakage of water from said end portion where it is pierced by said conduit, said sealing means adapted to permit rotation of said conduit.

4. The invention as in claim 2 including a second sealing means for preventing the leakage of water from said segment where it is pierced by said conduit.

5. The invention of claim 2, wherein said conduit is disposed in coaxial relationship to said pipe end portion, and said housing is disposed in vertical alignment with said pipe end portion.

6. The invention of claim 1, wherein is included a plurality of electrical supply conductors for bringing electrical energy from a power source to one of said slip rings and said wiping contacts.

* * * * *